Aug. 4, 1936.　　　　J. J. GORDON　　　　2,049,440
PROCESS OF REMOVING WATER FROM AQUEOUS ALIPHATIC ACIDS
Filed Sept. 15, 1934　　　3 Sheets-Sheet 3
Fig. 3.　EXPRESSION OF RAOULT'S LAW AS APPLIED TO A SYSTEM OF n-PROPYL ACETATE & n-PROPYL ALCOHOL
CONSTANT TEMPERATURE - 82.5°C.
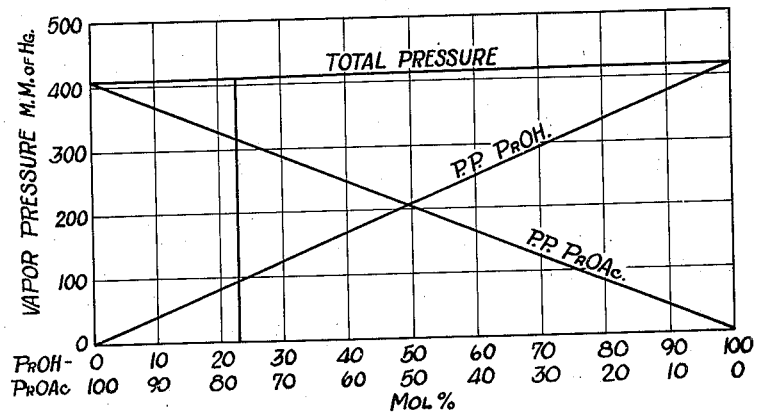
Fig. 4.　VAPOR PRESSURE CURVES FOR WATER, n-PROPYL ACETATE AND n-PROPYL ALCOHOL AT 60-90°C.
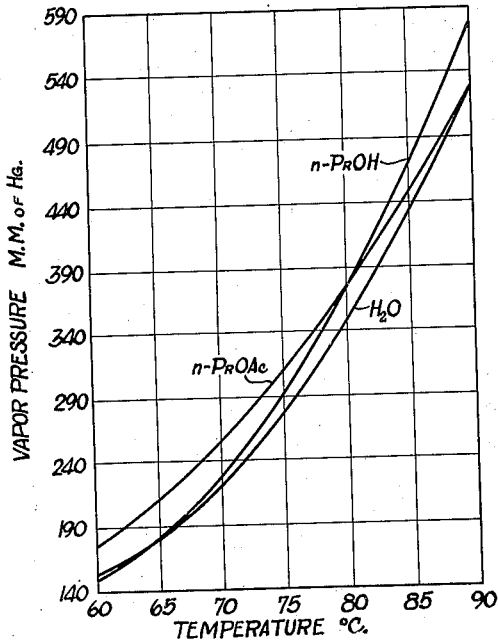
INVENTOR
Jack C. Gordon
Newton M. Perrin
By Daniel J. Mayne
Attorneys Patented Aug. 4, 1936

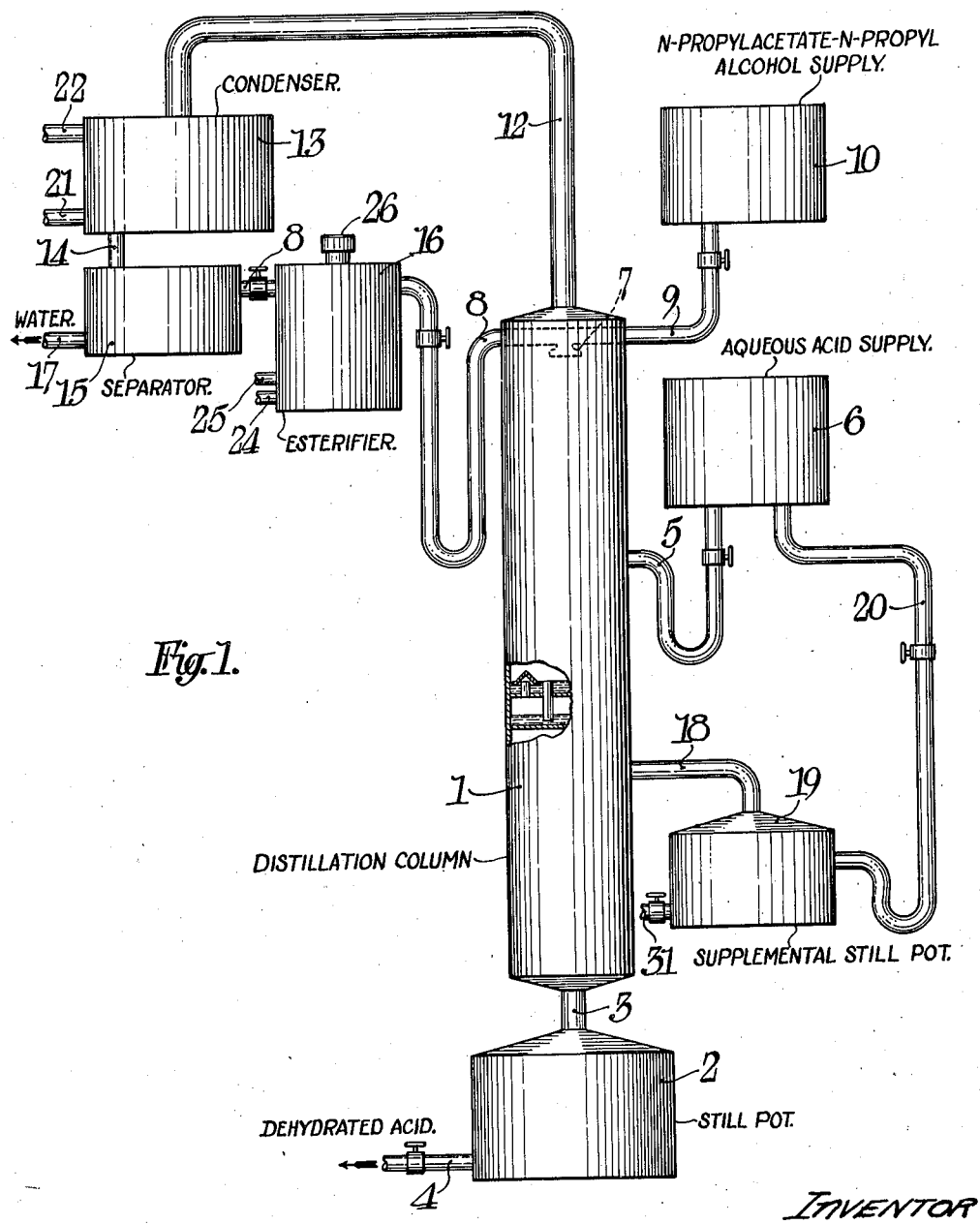

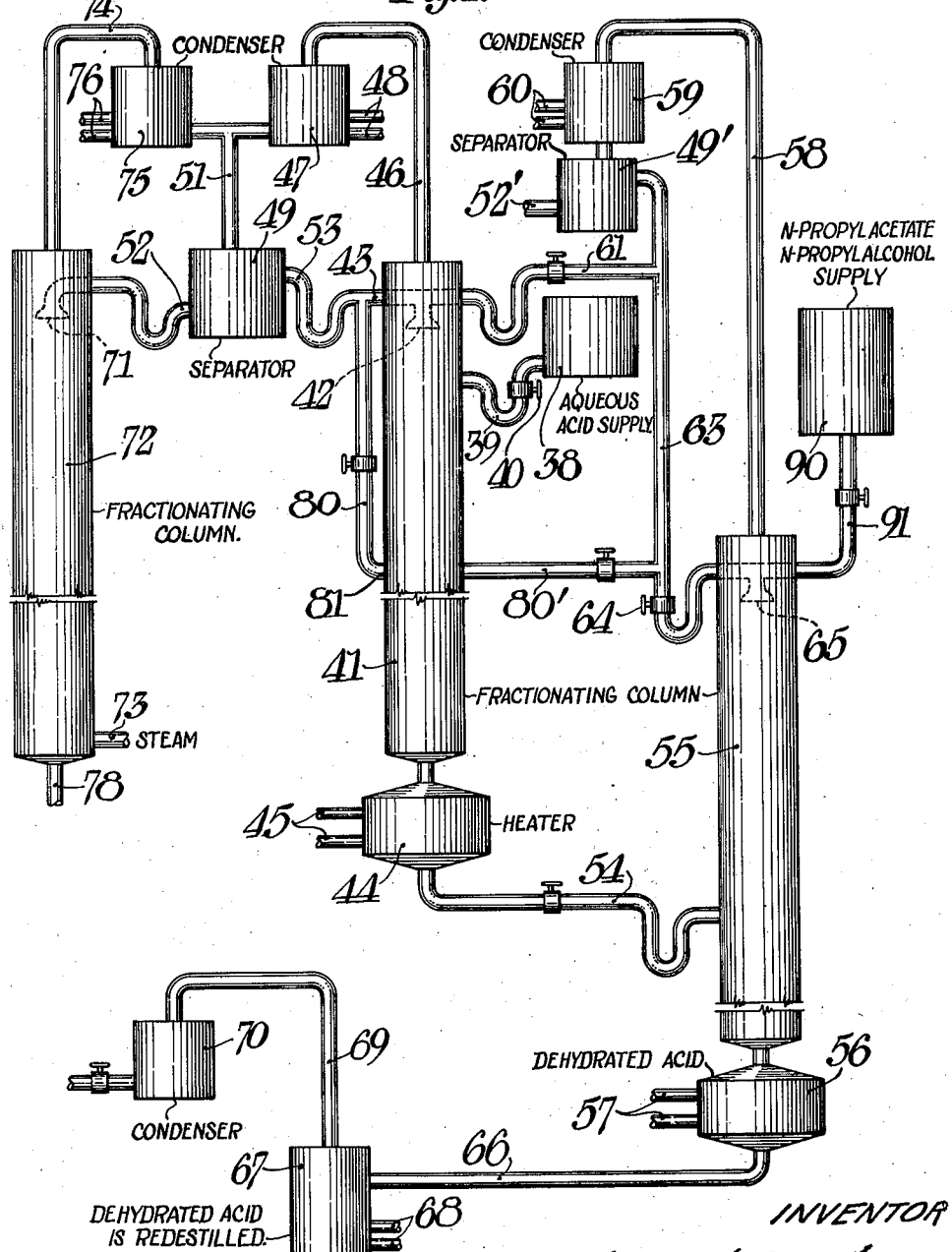

2,049,440

UNITED STATES PATENT OFFICE 2,049,440

PROCESS OF REMOVING WATER FROM AQUEOUS ALIPHATIC ACIDS

Jack J. Gordon, Kingsport, Tenn., assignor to Eastman Kodak Company, Rochester, N. Y., a corporation of New York Application September 15, 1934, Serial No. 744,250

8 Claims. (Cl. 202—42)

This invention relates to processes of removing water from aqueous aliphatic acids and more particularly to processes for the dehydration of dilute aqueous solutions of acetic, propionic, and other aliphatic acids or mixtures thereof by distillation employing as entraining agents esters of an aliphatic acid and an aliphatic alcohol, the esters containing five to six carbon atoms and being associated with an aliphatic alcohol containing three to four carbon atoms.

The complete or partial dehydration of aqueous aliphatic acids or mixtures thereof is a problem of great technical importance. For example, certain processes, such as the manufacture of cellulose acetate or other cellulosic materials, require large quantities of concentrated or anhydrous acids, and after the processes are completed, there is generally left a great amount of dilute acid which must be dehydrated before the acid can be reutilized. There are various other sources of dilute acid, as, for example, the acid liquids, together with various impurities, obtained by the destructive distillation of wood. After separating out the impurities from this material, which is called pyroligneous liquor, the solution must be concentrated to recover the desired acids.

Likewise, when acids are produced by the action of micro-organisms, they are obtained in the dilute state and must be concentrated in order to obtain the desired commercial product. It is, therefore, obvious that to lessen the expense of dehydration without the sacrifice of efficiency is a highly desirable result.

Various processes for the concentration or dehydration of aliphatic acids have been devised, among which may be mentioned distillation processes employing withdrawing or extracting agents, such as ethyl or propyl acetates. It has also been proposed to extract dilute acids with ethyl acetate, ethyl butyrate, or iso-propyl acetate, after which the extract is further treated with an alcohol for the purpose of producing more ester, the resulting mixture being finally distilled to vaporize off the ester and water as an azeotropic mixture.

While the use of such agents as propyl acetate are superior to other agents of the prior art, particularly from the heat economy standpoint, unless these agents are used in certain ways, some technical difficulties may arise. As, for example, in case propyl acetate is used in dehydrating acetic acid by extraction and an excess of propyl acetate remains in the anhydrous acid, because the boiling point and vapor pressure characteristics of propyl acetate are quite close to that of acetic acid, it is substantially impossible from the commercial standpoint to separate this excess.

I have developed a group of new withdrawing agents for dehydrating dilute aliphatic acids, which have been proved to be superior in many respects to any heretofore known, together with new continuous processes for utilizing these agents.

This invention has as an object to provide a process of removing water from dilute solutions of acetic, propionic, and other aliphatic acids or mixtures thereof. A further object is to provide a process which is applicable not only to relatively pure water solutions of acetic, propionic, and other acids, but also to the production of dehydrated acid from crude aqueous solutions, such as pyroligneous liquor. A still further object is to provide a process for the concentration of aqueous solutions of acetic acid mixed with varying proportions of other aliphatic acids. Another object is to provide a process in which the water removed carries with it to waste only a very small amount of acid. A further object is to provide a process in which distillation is the main factor. It is also an object to provide a process which will be simple, inexpensive, and yet applicable to solutions of any strength. Another object is to provide withdrawing agents that removes more water per unit withdrawing agent than others which allow operable temperatures with aliphatic acids. Still another object is to provide a process in which the amount of heat required is kept to a low value. It is also an object to provide a process of concentrating aqueous aliphatic acids which is continuous. Another object is to provide a process in which the finally dehydrated acid is not materially contaminated with the dehydrating agent. A still further object is to provide a process in which the composition of the dehydrating agent may be regulated. Other objects will appear hereinafter.

These objects are accomplished by the following invention which comprises primarily a distillation process for removing water from aqueous aliphatic acids in which a water entraining agent is employed. According to the following, which is the preferred embodiment of my invention, I have found that highly desirable results may be obtained by incorporating with the aqueous acid or acid mixture a dehydrating agent, also referred to as an entraining agent or water withdrawing agent, comprising normal-propyl acetate and normal-propyl alcohol, and distilling water and agent from the mixture to be dehydrated at a temperature below the boiling point of the acid or acids in question and also below the boiling point of water. It is important to note that my preferred entraining agent does not fall in the class of extremely low boiling-point compounds, but falls generally in a class of moderately low-boiling point agents heretofore considered unsuitable as entraining agents.

My preferred embodiment is further distinguished by the fact that the removal of water from the acid takes place at a relatively low temperature. Furthermore, the distillate does not require extensive treatment in order to recover the entraining agent as may be the case when using some high-boiling point agents of the prior art.

My process may be carried out in a fractionating column of known type, although it is to be noted that I have provided an apparatus for the purpose which is described hereinafter. The distilled water and entraining agent of normal-propyl acetate and normal-propyl alcohol may be condensed and allowed to separate into layers. The entraining agent which forms the upper layer is generally returned to the column for re-use, while the water layer may be passed to a recovery system or discarded. In the preferred embodiment of my process, the normal-propyl acetate-n-propyl alcohol entrainer passes through a cycle without serious loss and can be re-used in a continuous manner.

I have found that my mixed entrainer comprising normal-propyl acetate and normal-propyl alcohol possesses all the desirable requisites of an organic agent for use in the dehydration of a dilute aliphatic acid by azeotropic distillation. It is suitable not only when used in the concentration of acetic acid, but also in the concentration of higher aliphatic acids, such as propionic. This mixed entrainer comprises, as a major constituent: normal-propyl acetate, $C_5H_{10}O_2$, which is a compound having a molecular weight of 102.1, density of .891, boiling point of 102° C., and as a minor constituent: normal-propyl alcohol, sometimes referred to as n-propyl alcohol or propanol-1. This other constituent is a colorless liquid having the following formula: $CH_3CH_2CH_2OH$, density of .799, and a boiling point of 97° C.

Other compounds which do not detrimentally affect the materials in their use as an entraining agent may, of course, be present in small amounts. The claims are to be construed as covering any such diluent materials and the use of n-propyl acetate and n-propyl alcohol either in the chemically pure or commercially obtainable form. Further details concerning the new propyl acetate-propyl alcohol entraining agent may be observed from a consideration of the following:

Azeotrope ratios

By examination of the accompanying chart (Fig. III), which is an expression of Raoult's law as applied to a system of n-propyl acetate-n-propyl alcohol, it will be seen that the total pressure over such a system of acetate and alcohol at the constant temperature of 82.5° C., is practically constant, varying only 10 mm. over the entire range from 100 mol. % ester to 100 mol. % alcohol. Therefore, in azeotropic distillation using a mixture of n-propyl acetate and n-propyl alcohol to form a constant boiling azeotrope with water, the azeotrope ratio of ester-alcohol mixture, which I will call agent, to water is calculated by the formula:

$$\frac{\text{Weight of agent}}{\text{Weight of water}} = \frac{\text{molecular weight of agent} \times \text{vapor pressure of agent}}{\text{molecular weight of water} \times \text{vapor pressure of water}}$$

It is a function of the molecular weight of the agent only and therefore a function of the composition of the agent.

EXAMPLES

1. *Pure ester, at 82.5° C.*

Vapor pressure water = 392.2 mm.  Molecular weight of water = 18
Vapor pressure n-propyl acetate = 410.00 mm.  Molecular weight of n-propyl acetate = 102

$$\frac{\text{Weight of agent}}{\text{Weight of water}} = \frac{102 \times 410}{18 \times 392.2} = \frac{5.93}{1}$$

therefore, when pure n-propyl acetate is used as agent, the azeotrope ratio is 5.93:1.

2. *Ester-alcohol mixture*

(a) In the operation of one semi-works apparatus setup, the average analysis of the agent showed 87.7% ester and 10.1% alcohol by weight; therefore 87.7+10.1=97.8 lbs. agent (ester and alcohol)

$$\frac{100 \times 87.7}{97.8} = \begin{cases} 89.5\% \text{ ester} \\ 10.5\% \text{ alcohol} \end{cases}$$

Basis: | Pounds
--- | ---
Agent | 100
Ester | 89.5
Alcohol | 10.5

$$\frac{89.5}{102} = .877 \text{ mol. ester}$$

$$\frac{10.5}{60} = \frac{.175 \text{ mol. alcohol}}{1.052 \text{ mols. total}}$$

Let $X$ = molecular weight of agent $$\frac{100}{X} = 1.052$$

$$X = 94.7$$

$$\frac{\text{Weight of agent}}{\text{Weight of water}} = \frac{94.7 \times 410}{18 \times 392.2} = \frac{5.4}{1} \text{ azeotropic ratio}$$

(b) In the operation of a large column, the agent's analysis over a period of 1 month considering all stills showed approximately 83% ester and 14.5% alcohol by weight. Therefore 83+14.5=97.5 lbs. agent (ester plus alcohol).

$$\frac{100 \times 83}{97.5} = \begin{matrix} 85.1\% \text{ ester} \\ 14.9\% \text{ alcohol} \\ \hline 100.0 \end{matrix}$$

Basis: | Pounds
--- | ---
Agent | 100
Ester | 85.1
Alcohol | 14.9

$$\frac{85.1}{102} = .835 \text{ mol. ester}$$

$$\frac{14.9}{60} = \frac{.248 \text{ mol. alcohol}}{1.083 \text{ mols total}}$$

Let $X$ = molecular weight of solvent $$\frac{100}{X} = 1.083$$

$$X = 92.3$$

$$\frac{\text{Weight of agent}}{\text{Weight of water}} = \frac{92.3 \times 410}{10 \times 392.2} = \frac{5.35}{1} \text{ azeotropic ratio}$$

This condition is represented by the vertical line on the chart. These computations show that our new withdrawing agent possesses improved properties from the azeotropic ratio standpoint, over a prior art dehydrating agent, namely, pure propyl acetate.

While it may be seen from the above examples that I have used a major proportion of normal-propyl acetate and a minor proportion of normal-propyl alcohol and would generally prefer these proportions, I do not wish to be limited to the exact values shown, since they have been given by way of illustration only, and the proportions of alcohol and normal-propyl acetate may be varied. In general, however, I prefer to use an agent comprising a composition by weight of from a small amount of normal-propyl alcohol, say in the neighborhood of 3%, up to around 25%, and the balance substantially all normal-propyl acetate.

In respect to certain of the other new agents embraced by this application, as for example, n-butyl acetate-n-butyl alcohol, it will be noted hereinafter that somewhat different proportions would be employed.

The advantage of using my mixed entrainer of normal-propyl acetate and normal-propyl alcohol over certain prior art entrainers is further evident from the following comparison:

| Agent | Azeotrope composition | B. p. of azeotrope |
| --- | --- | --- |
| Propylene chloride | 88% propylene chloride<br>12% water | 78° |
| n-Propyl acetate | 86% n-propyl acetate<br>14% water | 82.4° |
| n-Propyl acetate<br>n-Propyl alcohol | 59½% n-propyl acetate<br>19½% n-propyl alcohol<br>21% water | 82.2° |

It will be noted that the normal-propyl acetate-normal-propyl alcohol mixture of this invention carries over the largest amount of water. This is very important, since it may readily be seen that the amount of water taken over is much greater than that taken over by any of the agents heretofore known. Furthermore, this large amount of water is taken over at a temperature slightly lower than that required by propyl acetate, for example. The mixture which will distil from a mixture containing these three constituents will then be of the above composition until all or one of the components is distilled off, since that particular ternary mixture distils at the lowest temperature. It is therefore evident that since this mixture contains an amount of water greater than that in the binary normal-propyl acetate-water mixture, there will be an increasing amount of water in the distillate as the alcohol content of the dehydrating agent increases. While I prefer to use an amount of alcohol in the neighborhood of the quantities disclosed in the above specific examples so as to carry over as large an amount of water as possible, it is clear, however, that advantage can be obtained by using other quantities of alcohol, hence I do not wish to be limited to the preferred amount.

The values set forth in the above computations and comparisons are accurate within a reasonable range allowed for experimental error. In some instances the values have been expressed to the nearest whole number.

If a distillation column is employed as the dehydrating apparatus, the acid gradually becomes more concentrated as it descends in the column, since it has the highest boiling point of any of the components undergoing distillation. The water and n-propyl acetate-n-propyl alcohol entrainer, are driven off from the acid as it descends and the entrainer, as it passes upward through the column, carries with it more and more water until there is distilled off from the top plate of the column the ternary azeotropic mixture above referred to.

It is desired to emphasize that one of the important advantages of my invention is that a given unit of normal-propyl acetate-n-propyl alcohol entrainer will carry over with it, as an azeotropic mixture, more water than an equal unit of any of the entraining agents previously suggested in the prior art.

When using a fractionating column, there is, from the practical standpoint, substantially no acid lost in the watery layer of the distillate in the case of any of the aliphatic acids or mixtures thereof. Since my process, when carried out in the proper apparatus and with the proper technique, causes substantially no acid losses in such layer, the process may be employed, therefore, to concentrate aqueous acetic or propionic acid from any strength to the anhydrous condition. By varying the length of the fractionating column to give more efficient rectification, the efficiency of the process can be still further increased. When concentrating a mixture of acids, as for example, acetic and propionic, there will be lost in the watery layer of the distillate minute amounts of both acids, but, from the practical standpoint, any such losses are negligible.

Any of the usual types of distillation apparatus may be used in carrying out my process. However, I prefer to use the form of apparatus disclosed in the drawings forming a part of the present application. In the accompanying drawings in which like reference characters refer to like parts:

Fig. 1 is a semi-diagrammatic side elevation of one form of apparatus in which my process may be carried out, certain of the parts being shown in exaggerated scale and other parts being shown broken away for clarity.

Fig. 2 is the same type of view as Fig. 1 of another form of arrangement of apparatus which may be used to carry out my invention.

Figs. 3 and 4 are charts showing certain relationships between pressures.

In Fig. 1 the numeral 1 represents a distillation column. A portion of the column is broken away to show the internal construction of the column in diagrammatic form. For carrying out my process, I have found a column still of approximately 52 plates construction to be suitable, although it is to be understood that other size columns may be used, and, in fact, I have investigated columns containing 33 plates. As indicated above, however, the longer column is preferred, since it gives more efficient rectification.

At the bottom of the column there is provided a still pot 2 of the usual construction. It may be heated by steam pipes or other well-known means and, if necessary, heat may be applied to points in the column 1. The still pot 2 is connected with the column by a pipe 3 for the purpose of conducting vapors rising from the still pot into the column 1. The still pot 2 is provided with a suitable draw-off pipe 4 equipped with a valve by means of which the partially or completely dehydrated acid may be withdrawn.

At a point approximately two-thirds the way up the column is provided a valve inlet pipe 5 for the introduction into the column of aqueous acid from the acid supply tank 6. This supply tank is mounted preferably above the inlet pipe in order that the acid will flow into the column by means of gravity. In the top portion of column 1 is provided an inlet 7 for the normal-propyl acetate-normal-propyl alcohol entrainer. Two valved supply pipes 8 and 9 connected with the inlet 7 are provided for introducing the entrainer into the head of the column. The supply pipe 9 is connected with an n-propyl acetate-n-propyl alcohol supply tank 10. Also, if desired, the supply tank 10 may be connected with the esterifier 16 for the purpose of introducing entrainer at this point. It is, of course clear, that if n-butyl acetate-n-butyl alcohol or some other agent of my invention was being employed it would be placed in tank 10, in place of the propyl acetate-propyl alcohol.

At the head of the column 1 is provided a vapor outlet pipe 12 which is connected with the condenser 13 which may be cooled with any suitable medium, such as by circulating water through the pipes 21 and 22. If heat economy is desired, the outlet pipe 12 may be passed through the esterifier 23 in order to supply heat thereto. Any condensate accumulating in the condenser 13 is conducted by means of a pipe 14 into the separator 15. The pipe 17 carries away the water which separates out to waste or to recovery, as preferred.

The pipe 8 ultimately conducts the entrainer, which also separates out, back to the column for re-use therein. Somewhere along this return pipe, or at any other suitable point in the entrainer cycle, may be inserted a hydrolyzing or esterifying unit 16. Suitable check valves, pipes and the like, or control valves may be inserted at suitable points to prevent vapors in the esterifier from backing up in the separator, or for by-passing the entrainer around the esterifier.

The esterifier unit comprises suitable means 24 and 25 for controlling the temperature of the unit. As indicated above, heat may be recovered from the distillate gases. A trap opening 26 is provided for introducing ester, alcohol, catalyst and the like, if necessary, to control the composition of the entrainer.

At a point approximately one-third the way up the column 1 is provided a vapor inlet 18 which connects the supplemental still pot 19 with column 1. A valved pipe line 20 is provided to conduct aqueous acid from the acid supply tank 6 to the supplemental still pot 19. The still pot 19 may be of usual construction and may be provided with valved outlet 31 for withdrawing therefrom any residual impurities as may collect therein. It is to be understood that suitable thermometers, flowmeters, etc., are inserted in the apparatus at proper points to aid in controlling the system.

Assuming n-propyl acetate-n-propyl alcohol is to be employed and assuming the plant to be newly constructed, it is necessary, in order to place it in operation, that the still pot 2 be charged with acid, such as, for example, concentrated acetic acid in the case of dehydrating dilute solutions of acetic acid. A supply of normal-propyl acetate-normal-propyl alcohol is placed in tank 10. Through the pipe 5 the aqueous acid is introduced slowly into the column 1 and heat applied to the still pot 2. At the same time a supply of normal-propyl acetate-normal-propyl alcohol is introduced into the column 1 through pipe 9. Upon starting the process, the lower plates of the column will contain aqueous acid and the upper plates of the column will contain normal-propyl acetate-normal-propyl alcohol entrainer. This condition exists, however, only at the start of the process because the process soon comes to equilibrium and operates in a continuous manner.

It may be stated at this point that it is an important feature of the present invention to so control the process that the resulting dehydrated acid does not contain any of the entraining agent. In general, this may be done in the following ways. It is preferred in all instances to use just about the right amount of entrainer, that is, adding at the start of the process, or at any other point or time in the process, just about enough entrainer to remove all or nearly all the water as an azeotrope. If anything, it is preferred to have just a very minute excess of water present. Should the water become too greatly in excess, a proper amount of entrainer may be added to the column, the separator, or the esterifier, to overcome this condition.

On the other hand, if an excess of normal-propyl acetate-normal-propyl alcohol entrainer should be present, sufficient water, as in the form of dilute acid, may be added to produce the preferred conditions, or the aqueous acid feed may be stopped and water refluxed until the desired balanced system is obtained, or, of course, some normal-propyl acetate-propyl alcohol entrainer may be removed from the system. That there is an excess of entrainer in the system may be determined in several ways. For example, the percentage of acid in the watery layer rapidly increases and, of course, entrainer will appear in the concentrated acid. Also a temperature rise in the system will occur.

Assuming that the process is to be operated continuously, the procedure is as follows: Upon the top plate of the column there exists a ternary azeotrope of normal-propyl acetate-normal-propyl alcohol-water. This constant boiling mixture is vaporized by the heat supplied to the column from the still pot 2 or other suitable point, and this vaporous mixture passes over through the pipe 12 into the condenser 13 where it is condensed into a liquid mixture which then passes through the pipe 14 into the separator 15.

In this separator the water, being the heavier of the liquids, settles to the bottom and passes off therefrom by means of pipe 17 leading to the sewer or, if it is desired to recover some of the agent, to a recovery system such as a flashing column. The pipe 8 returns the normal-propyl acetate-normal propyl alcohol to the esterifier, if necessary, to control the composition. Or a portion of the entrainer may be returned to the head of the column through inlet 7 and a portion of the normal-propyl acetate-propyl alcohol to a point lower in the column also for the purpose of controlling the entrainer composition. This feature of returning the entrainer to a lower portion of the column is described in more detail hereinafter.

The process being in continuous operation, it is usually unnecessary to add any further amount of normal-propyl acetate-normal-propyl alcohol from the supply tank 10. Any additions that are made would be used only to make up for the small amount of entrainer which may be lost in the system from slight leakage or by being carried off in some manner such as by mechanical occlusion.

Assuming that the process is to be operated without the assistance of a supplemental pot 19, aqueous acid is continuously introduced through the pipe 5 at a rate equivalent to the capacity of the column still 1 for dehydrating the aqueous acid. The lower portion of the column 1 will then perform substantially the same function as the additional or supplemental column which may be used in processes of this type and will vaporize the dilute acid to meet the downwardly coming entrainer. The substantially concentrated acid refluxes into the still pot 2 where the excess accumulating is drawn off through the pipe 4 and may be conducted to storage or such use as may be desired.

If, instead of introducing the aqueous acid by means of pipe 5, it is desired to employ the supplemental still pot 19, we may assume that the pipe line 5 is entirely shut off and the aqueous acid is conducted directly to the still pot 19. In the still pot 19 the aqueous acid is vaporized and the mixed vapors of water and acid are conducted by means of pipe 18 into the column 1. These acid and water vapors then travel up in the column and meet the downwardly progressing supply of normal-propyl acetate-propyl alcohol entrainer in the event this entrainer is being employed. The water combines with this entrainer and forms a ternary azeotrope which distills off and passes in a vaporous state onto the next higher plate, and so on up the column; the acid, assisting in vaporizing this azeotype, condenses and passes down the column so that the net result, when the supplemental still pot 19 is utilized, is about the same as when the aqueous acid is introduced into the column through the pipe 5 in liquid form, the differences being that the still pot prevents the column from becoming contaminated with certain impurities and the composition of the mixture upon each plate will vary slightly due to the fact that the water, in liquid or vapor form, respectively, is introduced at different positions in the column. The pipe 18 may be provided with a suitable valve, in the event it may be desired to change from one mode of operation to the other at different times. As will be understood by those skilled in the art, the exact point in the column at which liquid or vaporous aqueous acid is introduced may be best determined by practice, since it is dependent on various factors, as the number of plates in the column and the like.

It is, of course, possible to simultaneously introduce the aqueous acid in vapor form through the line 18, and in liquid form through the line 5. In any event, if operating the process by any of the methods described, it is necessary merely that the operator control the input of the various materials into the column in a way as already set forth, that substantially pure, concentrated acid issues from the bottom of the column.

Fig. 2 shows diagrammatically a somewhat different form of apparatus for carrying out my invention. The supply tank of aqueous acid 38 is connected by pipe 39 controlled by valve 40 with an intermediate portion of a fractionating column 41. At the top of this column a downward current or spray of normal-propyl acetate-normal-propyl alcohol entrainer enters from the orifice 42 which is connected with the transverse pipe 43. The base of the column is provided with a heating vessel 44, the heating fluid for which comes through pipes 45.

The ternary azeotropic mixture of normal-propyl acetate, normal-propyl alcohol, and water is distilled from the top of the column through pipe 46 from which it enters condenser 47, this condenser being cooled by a cooling fluid which circulates through pipes 48. The distillate from pipe 47 flows into settling chamber 49, by means of pipe 51. When the distillate reaches vessel 49, it separates into two layers, the water layer being the lower. From this vessel 49, the water layer passes through exit pipe 52 to a further treating apparatus which will be described hereinafter. The normal-propyl acetate-propyl alcohol layer passes out through pipe 53 to pipe 43.

It may be desirable to pass the entraining agent into an esterifying unit similar to unit 16 of Fig. 1 inserted at some suitable place in the entrainer cycle, or, rather than return all the entrainer through nozzle 42, a portion may be returned at a point lower in the column for the purpose of controlling the composition of the entrainer as previously discussed, that is, connected with return pipe 53 is a vertically extending pipe 80 which joins with column 41 at some lower point as at 81. The function of this arrangement of apparatus is best illustrated by the following example: assuming a fifty-two plate column is being employed, operating on 28% aqueous acetic acid and using a mixture of n-propyl acetate-n-propyl alcohol as an entrainer, about 86% of the entrainer from separator 49 is returned to the 52nd plate to furnish reflux washing and 14% to the 27th plate to become enriched in ester.

The entrainer from the separator has been hydrolyzed to some extent in its cycle, hence it may have a higher alcohol content than desired. Bringing it in intimate contact, at the 27th plate, with a relatively strong acid at an elevated temperature causes partial esterification of the alcohol content and increases the ester content of the entire body of the entrainer. This arrangement will maintain a desirable entrainer composition in the present instance of approximately 15% n-propyl alcohol, and 83% n-propyl acetate, the balance being dissolved water.

The above values have been given merely for the purpose of illustration. The proportion of entrainer returned to the lower portion of the column may be varied in order to change the rate and amount of reesterification or the entrainer may be returned at other points than the 27th plate, but, of course, at a lower level than that at which the main portion is returned. Also, entrainer may be injected at a lower point by means of pipe 80'. This feature of returning a portion of the n-propyl acetate-n-propyl alcohol to a lower point in the column in order to control its composition is to be distinguished from processes of the prior art where a portion of a one-component agent has been returned to a lower point in the column for the mere purpose of more intimate contact with the acid to be concentrated.

In conducting the process in the apparatus shown in Fig. 2 it is preferred to operate the process so that column 41 contains an excess of water. The partially dehydrated acid in vessel 44 is conducted through valved pipe 54 to an intermediate portion of an auxiliary fractionating column 55 where the quantity of entrainer is carefully controlled in a manner, as previously described, to yield anhydrous acid uncontaminated with agent.

There are a number of advantages derived from this two-step concentration such as for example: Dilute acid of various strengths and from various sources may be readily concentrated, in the first step operating with an excess water, to produce an acid of uniform strength say around 90%. This uniform partially concentrated acid is then completely dehydrated under carefully controlled conditions. These features are of importance to users of large quantities of acid from various sources since it provides a method in which expert control is required in removing only a small quantity of water.

The heating of column 55 is done in chamber 56, the heating fluid for which circulates through pipes 57. Vapors of normal-propyl acetate, normal-propyl alcohol and water pass from the top of the column to the pipe 58 to condenser 59, the cooling fluid for which circulates through pipe 60. This condensed distillate is separated in separator 49' and the entrainer layer can be passed partly through valved pipe 61 into pipe 43 and nozzle 42 of the main column and partly through pipe 63 controlled by valve 64 into the nozzle or opening 65 at the top of column 55 there to act as refluxing liquid. Any additional entrainer may be supplied to the system from container 90, through valved pipe 91. The watery layer from separator 49' may be drawn off through conduit 52' and disposed of in the same manner as described hereinafter with respect to separator 49.

Referring to the upper left-hand part of Fig. 2, the watery layer from the settling vessel 49 passes through pipe 52 to a nozzle or opening 71 at the top of column 72. Steam is blown into the column through pipe 73 and hot water passes to waste through pipe 78, or to a heat exchange, not shown. The passage of the steam up the column 72 flashes off the small amount of entrainer which may be present in the watery material descending from nozzle 71. These vapors containing entrainer pass through pipe 74 into condenser 75, the cooling fluid of which circulates through pipe 76. The entrainer from condenser 75 passes through pipe 51 into settling vessel 49 and thence returns to the system through the normal circulatory path of the normal-propyl acetate-propyl alcohol.

From the foregoing it will be apparent that my invention may be carried out in many forms of apparatus of which Figs. 1 and 2 are given for the purposes of illustration only. The invention might even be carried out with only an ordinary distillation flask and condenser, although that would not be nearly as economical on a commercial scale. While in Fig. 1 a single column has been shown, it is to be understood that for other constructions it may be desirable to construct such a column in two or more sections placed one above or alongside of the other or in staggered relation. Other forms of apparatus and methods of carrying out the invention may be employed without departing from the spirit and scope thereof.

It will also be understood that the customary precautions for preventing heat losses by suitable insulation will be observed. The parts which contact with the acids are made out of materials suitable for that purpose, such as for example, copper or copper alloys, iron-silicon alloys, and stainless steel, such as the 18/8 variety, for example. Parts that are subjected to heat will also be constructed of suitable heat-resisting materials. The process is preferably operated under atmospheric pressure conditions, although it can be conducted with the system at pressures either above or below atmospheric. When I refer to boiling points and the like, I refer to this data as being obtained under normal atmospheric conditions.

In the preceding description I have set forth numerous details concerning n-propyl acetate-n-propyl alcohol because this mixed entrainer and the apparatus and processes relating thereto comprises my preferred embodiment. However my invention is not to be construed as limited thereto.

In my investigation I have also determined that there are other new ester-alcohol entraining agents which are very satisfactory and to which the processes and apparatus described above may be applied. For example the following combinations may be mentioned: isopropyl acetate—iso propyl alcohol, propyl propionate—propyl alcohol, n-butyl acetate—n-butyl alcohol, and iso-butyl acetate—iso-butyl alcohol. Generically then, my agent may be described as comprising an ester of an aliphatic acid and an aliphatic alcohol, together with an aliphatic alcohol. The ester contains from five to six carbon atoms, and the alcohol contains from three to four carbon atoms.

The propyl propionate-propyl alcohol mixture is of particular value in the dehydration of propionic acid. Also the n-butyl acetate-n-butyl alcohol or iso-butyl acetate-iso butyl alcohol combinations are very useful in concentrating aqueous propionic acid or aqueous mixtures strong in propionic acid.

It is important to note that these ester-alcohol agents also carry over large amounts of water as indicated by the following examples:

| Agent | Azeotrope composition | B. p. of azeotrope |
| --- | --- | --- |
| n-Butyl acetate<br>n-Butyl alcohol | n-Butyl acetate 35.3%<br>n-Butyl alcohol 27.4%<br>Water 37.3% | 89.4° C. |
| Iso-butyl acetate<br>Iso-butyl alcohol | Iso-butyl acetate 46.5%<br>Iso-butyl alcohol 23.1%<br>Water 30.4% | 87.4° C. |

In employing these other agents in the processes and apparatus which have been described above in detail with respect to n-propyl acetate-n-propyl alcohol, of course due regard will be had for any differences in characteristics in the agents. That is, for example, n-butyl acetate-n-butyl alcohol yields a ternary azeotrope with water which boils at 89.4%. This is slightly higher than the boiling point of the azeotrope formed when n-propyl acetate-n-propyl alcohol is the entrainer. It is therefore, apparent due regard must be had for this temperature difference and higher temperatures employed.

However, it is clear, particularly in the treatment of aqueous propionic acid solutions, that an azeotrope boiling at 89.4° C. is sufficiently removed from the boiling point of the acid to be satisfactorily separated therefrom. The various features described in detail with respect to propyl acetate-propyl alcohol, such as controlling the entrainer's composition, and of producing either partially or completely dehydrated acid apply to each of the ester-alcohol combinations disclosed.

Fig. 3 is a graphic representation of pressures relating to the n-propyl acetate-n-propyl alcohol system. The notations thereon and on Fig. 4 have the following meanings:—n-prO Ac represents normal propyl acetate, n-prOH represents normal propyl alcohol, m. m. of Hg stands for millimeters of mercury, P. P. stands for partial pressure.

Fig. 4 is also a similar representation of pressure curves of water, normal-propyl acetate, and normal-propyl alcohol at 60–90° C.

The above disclosure shows that an ester-alcohol entrainer is highly efficient in the concentration of lower aliphatic acids (except formic) and including acetic, propionic, butyric and possibly others. I have found that the preferred process herein described is especially effective in the dehydration of aqueous acetic acid which may contain in some instances varying amounts of other aliphatic acids, as would be the case of pyroligneous liquor.

What I claim as my invention and desire to secure by Letters Patent of the United States is:

1. A continuous process of treating aqueous aliphatic acid to produce dehydrated acid therefrom by a series of steps including azeotropic distillation with a mixture of an aliphatic ester and an aliphatic alcohol as a withdrawing agent which is characterized by being capable of forming with water a ternary azeotropic composition which boils below the boiling point of the aliphatic acid under treatment, the aliphatic ester being present in the mixture in a predominating proportion and having from five to six carbon atoms, and the aliphatic alcohol being present in the mixture in a proportion greater than 3% and having from three to four carbon atoms, which comprises supplying the unit with the withdrawing agent, supplying the aqueous aliphatic acid to be concentrated to the distillation unit, vaporizing a ternary azeotropic composition containing aliphatic ester, aliphatic alcohol and water from the unit, condensing these vaporized materials, separating a mixture of ester and alcohol from the condensate, utilizing a major part of the separated ester and alcohol to dehydrate further aqueous aliphatic acid in the unit and withdrawing from the lower part of the unit an acid from which at least a substantial amount of water has been removed.

2. A continuous process for treating aqueous acetic acid to produce dehydrated acetic acid therefrom by a series of steps including azeotropic distillation with a mixture of an aliphatic ester and an aliphatic alcohol as a withdrawing agent which is characterized by being capable of forming with water a ternary azeotropic composition which boils below the boiling point of acetic acid, the aliphatic ester being present in the mixture in a predominating proportion and having from five to six carbon atoms, and the aliphatic alcohol being present in the mixture in a proportion greater than 3% and having from three to four carbon atoms, which comprises supplying the unit with the withdrawing agent, supplying the aqueous acetic acid to be concentrated to the distillation unit, vaporizing a ternary azeotropic composition containing aliphatic ester, aliphatic alcohol and water from the unit, condensing these vaporized materials, separating a mixture of the ester and alcohol from the condensate, utilizing a major part of the separated ester and alcohol to dehydrate further aqueous acetic acid in the unit and withdrawing from the lower part of the unit acetic acid from which a substantial amount of water has been removed by the process.

3. A continuous process for removing water from aqueous solutions containing at least one lower aliphatic acid by a series of steps including azeotropic distillation in a distillation unit with a mixture of an aliphatic ester and an aliphatic alcohol as a withdrawing agent which is characterized by being capable of forming with water a ternary azeotropic composition which boils below the boiling point of the aliphatic acid under treatment, the aliphatic ester being present in the mixture in a predominating proportion and having from five to six carbon atoms, and the aliphatic alcohol being present in the mixture in a proportion greater than 3% and having from three to four carbon atoms, which comprises supplying the unit with the withdrawing agent, supplying the aqueous aliphatic acid to be concentrated to the distillation unit, vaporizing a ternary azeotropic composition containing aliphatic ester, aliphatic alcohol and water from the unit, condensing these vaporized materials, separating a mixture of ester and alcohol from the condensate, returning at least the major part of the separated ester and alcohol to the upper part of the unit and withdrawing from the lower part of the unit an acid from which at least a substantial amount of water has been removed by the process.

4. A continuous process for removing water from aqueous solutions containing at least one lower aliphatic acid to produce concentrated acid therefrom by a process including azeotropic distillation in a distillation unit with a mixture of butyl acetate and more than 3% but less than a predominating amount of butyl alcohol as a withdrawing agent, which comprises supplying the unit with a mixture of butyl acetate and butyl alcohol, supplying the aqueous aliphatic acid to the distillation unit, vaporizing a ternary azeotropic composition containing butyl acetate, butyl alcohol and water from the unit, condensing these vaporized materials, separating butyl acetate and butyl alcohol from the condensate, returning at least a major part of the separated butyl acetate and butyl alcohol to the upper part of the unit, and recovering from the unit aliphatic acid from which at least a substantial amount of water has been removed by the process.

5. A continuous process for removing water from aqueous solutions containing acetic acid to produce concentrated acetic acid therefrom by a series of steps including azeotropic distillation in a distillation unit with a mixture of butyl acetate and more than 3% but less than a predominating amount of butyl alcohol, which comprises supplying the unit with a mixture of butyl acetate and butyl alcohol, supplying the aqueous acetic acid to the distillation unit, vaporizing a ternary azeotropic composition containing butyl acetate, butyl alcohol and water from the unit, condensing these vaporized materials, separating butyl acetate and butyl alcohol from the condensate, returning at least a major part of the separated butyl acetate and butyl alcohol to the upper part of the unit, and recovering from the unit acetic acid from which at least a substantial amount of water has been removed by the process.

6. A continuous process for removing water from aqueous solutions containing at least one lower aliphatic acid to produce concentrated acid therefrom by a series of steps including azeotropic distillation in a distillation unit with a mixture of propyl acetate and more than 3% but less than a predominating amount of propyl alcohol as a withdrawing agent, which comprises supplying the unit with a mixture of propyl acetate and propyl alcohol, supplying the aqueous aliphatic acid to the distillation unit, vaporizing a ternary azeotropic composition containing propyl acetate, propyl alcohol and water from the unit, condensing these vaporized materials, separating propyl acetate and propyl alcohol from the condensate, returning at least a major part of the separated propyl acetate and propyl alcohol to the upper part of the unit, and recovering from the unit aliphatic acid from which at least a substantial amount of water has been removed by the process.

7. A continuous process for removing water from aqueous solutions containing at least one lower aliphatic acid to produce concentrated acid therefrom by a series of steps including azeotropic distillation in a distillation unit with a mixture of propyl propionate and more than 3% but less than a predominating amount of propyl alcohol as a withdrawing agent, which comprises supplying the unit with a mixture of propyl propionate and propyl alcohol, supplying the aqueous aliphatic acid to the distillation unit, vaporizing a ternary azeotropic composition containing propyl propionate, propyl alcohol and water from the unit, condensing these vaporized materials, separating propyl propionate and propyl alcohol from the condensate, returning at least a major part of the separated propyl proprionate and propyl alcohol to the upper part of the unit, and recovering from the unit aliphatic acid from which at least a substantial amount of water has been removed by the process.

8. A process for treating aqueous aliphatic acid to produce dehydrated acid therefrom by a series of steps including azeotropic distillation with a mixture of an aliphatic ester and an aliphatic alcohol as a withdrawing agent which is characterized by being capable of forming with water a ternary azeotropic composition which boils below the boiling point of the aliphatic acid under treatment, the aliphatic ester being present in the mixture in a predominating proportion and having from five to six carbon atoms, and the aliphatic alcohol being present in the mixture in a proportion greater than 3% and having three to four carbon atoms, which comprises subjecting a mixture of the aqueous acid and the withdrawing agent to a distillation treatment, vaporizing a ternary azeotropic composition containing aliphatic ester, aliphatic alcohol and water from the aqueous acid, withdrawing a partially dehydrated acid, and subjecting this partially dehydrated acid to a further distillation treatment under conditions whereby a pure anhydrous acid is obtained.

JACK J. GORDON.